(12) United States Patent
Nishimura et al.

(10) Patent No.: US 6,320,003 B1
(45) Date of Patent: Nov. 20, 2001

(54) METHOD FOR PRODUCING A POLYOLEFIN

(75) Inventors: Sadaki Nishimura, Yokkaichi; Yutaka Naito, Mie-ken; Mitsuhiro Mori, Aichi-ken; Yozo Kondo, Yokkaichi, all of (JP)

(73) Assignee: Tosoh Corporation, Shinnanyo (JP)

( * ) Notice: Subject to any disclaimer, the term of this patent is extended or adjusted under 35 U.S.C. 154(b) by 0 days.

(21) Appl. No.: 08/338,825

(22) Filed: Nov. 10, 1994

Related U.S. Application Data

(63) Continuation of application No. 07/907,638, filed on Jul. 2, 1992, now abandoned.

(30) Foreign Application Priority Data

Jul. 3, 1991 (JP) .................................................. 3-188281
Aug. 6, 1991 (JP) .................................................. 3-219326

(51) Int. Cl.$^7$ ........................................................ C08F 4/42
(52) U.S. Cl. ...................... 526/124.9; 526/116; 526/114; 526/119; 526/125.1; 526/124.1; 526/142; 526/348; 526/352
(58) Field of Search ................................... 526/114, 116, 526/119, 125.1, 124.1, 142, 348, 352, 124.9

(56) References Cited

U.S. PATENT DOCUMENTS

| | | | | |
|---|---|---|---|---|
| 4,109,071 | * | 8/1978 | Berger et al. | 526/114 |
| 4,226,964 | * | 10/1980 | Tanaka et al. | 526/114 |
| 4,394,291 | * | 7/1983 | Hawley | 526/119 |
| 4,405,769 | * | 9/1983 | Capshew et al. | 526/904 |
| 4,410,671 | * | 10/1983 | Welch et al. | 526/116 |
| 4,551,439 | | 11/1985 | Harada et al. | . |
| 5,053,467 | * | 10/1991 | Kondo et al. | 526/119 |
| 5,112,927 | * | 5/1992 | Hara et al. | 526/124 |
| 5,118,769 | * | 6/1992 | Kondo et al. | 526/128 |

FOREIGN PATENT DOCUMENTS 0 087 100   8/1983   (EP) .

\* cited by examiner

*Primary Examiner*—David W. Wu
*Assistant Examiner*—Ling-Siu Choi
(74) *Attorney, Agent, or Firm*—Oblon, Spivak, McClelland, Maier & Neustadt, P.C.

(57) ABSTRACT

A method for producing a polyolefin in the presence of a catalyst comprising a transition metal compound and an organometallic compound, wherein a catalyst system is used which comprises (A) a solid catalyst component prepared by reacting a homogeneous solution containing (I) at least one member selected from the group consisting of metal magnesium and a hydroxylated organic compound, and oxygen-containing organic compounds of magnesium, (II) at least one zirconium compound selected from the group consisting of oxygen-containing organic compounds and halogen-containing compounds of zirconium, and (III) at least one silicon compound selected from the group consisting of polysiloxanes and silanes, with (IV) at least one organoaluminum halide compound to obtain a solid product, isolating the solid product, and reacting this solid product with (V) at least one halogen-containing compound of titanium, and (B) at least one catalyst component selected from the group consisting of organoaluminum compounds.

4 Claims, No Drawings

METHOD FOR PRODUCING A POLYOLEFIN

This application is a Continuation of application Ser. No. 07/907,638, filed on Jul. 2, 1992, now abandoned.

FIELD OF THE INVENTION

This invention relates to a method for producing a polyolefin. More particularly, this invention relates to a method which enables to obtain a polymer having a desired molecular weight distribution and a good configuration of particles while maintaining high catalytic activity in polymerizing at least one olefin.

BACKGROUND OF THE INVENTION

It is already known to use a catalyst system comprising a transition metal compound and an organometallic compound for low-pressure polymerization of olefins. In recent years, a large number of proposals have been made for producing, as a highly active catalyst, a solid catalyst component comprising magnesium, titanium and halogen as main components.

However, to obtain higher productivity, it is very important from the industrial viewpoint to aim not only at high catalytic activity but also at improving the particle size, the bulk density and the like of polymer particles. At the same time, it is now demanded to optionally control the molecular weight distribution of the resulting polymer for satisfying the diversification of qualities.

In Japanese Examined Patent Publication No. 39714/1977, the present inventors previously proposed a polymerization method which can produce a polyolefin having a desired molecular weight distribution while maintaining high catalytic activities by employing a catalyst system comprising a reaction product of metal magnesium, a hydroxylated organic compound, an organic oxidized compound of a transition metal, a halogen-containing compound of a transition metal and an aluminum halide, and an organometallic compound, but it was still insufficient from the viewpoint of improvement in the particle properties such as the particle size, bulk density and the like of polymer particles.

A serious problem which usually occurs in conducting polymerization is soiling of a reactor (deposition of a solid polymer on the inner surface of the reactor), whereby it is necessary to stop the polymerization operation to remove the deposition. Such a problem tends to be significant particularly in the production of a resin having a broad molecular weight distribution such as the one which is to be used for blow molding, extrusion molding or the like.

On the other hand, if the particle size distribution is broad, various problems are likely to occur during the production of a polyolefin, for example, in the steps of polymerization, separation of the particles from the polymer slurry, drying of the powder and transportation of the powder, and in some cases, long-term continuous production becomes impossible. Further, when a polymer is obtained by multi-stage polymerization, if the particle size distribution of the polymer particles is broad, classification of the powder is likely to occur after the drying step, i.e. at the stage where additives are added or at the stage of transportation. The physical properties differ from one particle size to another and the adverse effects to the quality can sometimes not be ignored. Further, in a gas phase polymerization, particle properties are particularly important in view of productivity because, if the powder properties are poor, blocking or the like of polymer particles occurs in the polymerization reactor.

Under these circumstances, in Japanese Examined Patent Publication No. 48682/1987, the present inventors previously proposed a method for improving or eliminating the above defects. In this method, a catalyst system is employed which comprises a solid catalyst component (A) obtained by reacting metal magnesium and a hydroxylated organic compound, or an oxygen-containing organic compound or halogen-containing compound of magnesium, with an oxygen-containing organic compound or halogen-containing compound of titanium, an oxygen-containing organic compound or halogen-containing compound of zirconium, a silicon compound, and an aluminum halide compound, and a catalyst component (B) of an organometallic compound.

However, this method could not lead to an improvement in the particle size distribution.

SUMMARY OF THE INVENTION

It is an object of the present invention to provide a method for producing a polyolefin, whereby a polymer having a good particle shape and a controlled molecular weight distribution can be obtained while maintaining the high catalytic activities.

The present inventors have now found that the above object can be attained by conducting the polymerization of an olefin in the presence of a novel catalyst system, and have accomplished the present invention on the basis of the discovery.

The present invention provides a method for producing a polyolefin in the presence of a catalyst comprising a transition metal compound and an organometallic compound, wherein a catalyst system is used which comprises:

(A) a solid catalyst component prepared by reacting a homogeneous solution containing
  (I) at least one member selected from the group consisting of metal magnesium and a hydroxylated organic compound, and oxygen-containing organic compounds of magnesium,
  (II) at least one zirconium compound selected from the group consisting of oxygen-containing organic compounds and halogen-containing compounds of zirconium, and
  (III) at least one silicon compound selected from the group consisting of polysiloxanes and silanes, with
  (IV) at least one organoaluminum halide compound to obtain a solid product, isolating the solid product, and reacting this solid product with
  (V) at least one halogen-containing compound of titanium, and
(B) at least one catalyst component selected from the group consisting of organoaluminum compounds.

The present invention also provides a method for producing a polyolefin in the presence of a catalyst comprising a transition metal compound and an organometallic compound, wherein a catalyst system is used which comprises:

(A) a solid catalyst component prepared by reacting a homogeneous solution containing
  (I) at least one member selected from the group consisting of metal magnesium and a hydroxylated organic compound, and oxygen-containing organic compounds of magnesium,
  (II) at least one zirconium compound selected from the group consisting of oxygen-containing organic compounds and halogen-containing compounds of zirconium, and (III) at least one silicon comound selected from the group consisting of polysiloxanes and silanes, with
(IV) at least one organoaluminum halide compound to obtain a solid product, isolating the solid product, and reacting this solid product with
(V) at least one halogen-containing compound of titanium, and
(VI) at least one compound selected from the group consisting of halogen-containing compounds of Groups IIIb and IVb of the Periodic Table, and
(B) at least one catalyst component selected from the group consisting of organoaluminum compounds.

DETAILED DESCRIPTION OF THE INVENTION AND PREFERRED EMBODIMENTS

Now, the present invention will be described in detail with reference to the preferred embodiments.

Metal magnesium and a hydroxylated organic compound, and oxygen-containing compounds of magnesium that are used as reactant (I) in the present invention will be described below.

Firstly, when metal magnesium and a hydroxylated organic compound are used, metal magnesium can take any form such as powdery form, granular form, foil form, or ribbon form, and as the hydroxylated organic compound, alcohols, organosilanols, and phenols are suitable.

As the alcohols, linear or branched aliphatic alcohols or alicyclic alcohols having 1 to 18 carbon atoms can be used. Specific examples include methanol, ethanol, n-propanol, i-propanol, n-butanol, i-butanol, n-hexanol, 2-ethylhexanol, n-octanol, n-stearyl alcohol, cyclopentanol, cyclohexanol, and ethylene glycol.

The organosilanols are those having at least one hydroxyl group and an organic group selected from an alkyl group, a cycloalkyl group, an arylalkyl group, an aryl group, and an alkylaryl group with 1 to 12, preferably 1 to 6, carbon atoms. For example, trimethylsilanol, triethylsilanol, triphenylsilanol, and t-butyldimethylsilanol may be mentioned.

As phenols, phenol, cresol, xylenol, and hydroquinone may be mentioned.

These hydroxylated organic compounds can be used alone or as a mixture of two or more of them.

In addition, when metal magnesium is used to prepare a solid catalyst component as the component (A) of the present invention, for the purpose of accelerating the reaction, it is preferable to add one or more substances that will react or form an adduct, with metal magnesium, e.g. polar substances such as iodine, mercuric chloride, halogenated alkyls, organic acid esters, and organic acids.

As compounds belonging to the oxygen-containing organic compounds of magnesium, the following compounds may, for example, be mentioned: magnesium alkoxides such as magnesium methylate, magnesium ethylate, magnesium isopropylate, magnesium decanolate, magnesium methoxyethylate and magnesium cyclohexanolate, magnesium alkylalkoxides such as magnesium ethylethylate, magnesium hydroalkoxides such as magnesium hydroxymethylate, magnesium phenoxides such as magnesium phenate, magnesium naphthenate, magnesium phenanthlenate and magnesium cresolate, and magnesium carboxylates such as magnesium acetate, magnesium stearate, magnesium benzoate, magnesium phenylacetate, magnesium adipate, magnesium sebacate, magnesium phthalate, magnesium acrylate, and magnesium oleate.

Further, also employed are oxygen-containing organic magnesium compounds which also contain nitrogen, namely, compounds having magnesium-oxygen-nitrogen-organic group bond in this order, for example, magnesium oxymates such as magnesium butyloxymate, magnesium dimethylglyoxymate and magnesium cyclohexyloxymate, magnesium hydroxamate salts, and magnesium hydroxylamine salts such as N-nitroso-N-phenyl-hydroxylamine derivatives.

Further, there may also be employed magnesium chelates i.e. oxygen-containing organic magnesium compounds in which magnesium has at least one magnesium-oxygen-organic group bond in this order and further at least one coordination bond to form a magnesium-containing heterocyclic ring, for example, magnesium enolates such as magnesium acetylacetonate, and complexes obtained from phenol derivatives having an electron donative group at the ortho position or meta position to the hydroxyl group, such as magnesium 8-hydroxy quinolinate.

Also, magnesium silanolates, i.e. compounds containing a magnesium-oxygen-silicon-hydrocarbon group bond in this order, for example, magnesium triphenyl silanolate, may be mentioned.

This series of the oxygen-containing organic compounds may, of course, include compounds containing several different organic groups such as magnesium methoxyethylate, and complex alkoxides or phenoxides of magnesium and other metals, such as, $Mg[Al(OC_2H_5)_4]_2$ and $Mg_3[Al(OC_2H_5)_6]_2$.

These oxygen-containing organic magnesium compounds are used alone or as a mixture of two or more of them.

As the oxygen-containing organic compounds and halogen-containing compounds of zirconium for the above-mentioned reactant (II), a compound represented by the general formula $[ZrO_a(OR^1)_bX^1_c]_n$ is used, in which $R^1$ represents a hydrocarbon group such as a linear or branched alkyl group, a cycloalkyl group, an arylalkyl group, an aryl group, and an alkylaryl group, having 1 to 20, preferably 1 to 10, carbon atoms, $X^1$ represents a halogen atom, i.e. F, Cl, Br or I, a, b and c are such that $a \geq 0$, $b \geq 0$ and $4 \geq c \geq 0$ and they are numbers agreeable with the valence of zirconium, and n is an integer. It is particularly preferred to use oxygen-containing organic compounds and halogen-containing compounds in which a is $0 \leq a \leq 1$ and n is $1 \leq n \leq 6$.

As specific examples, $Zr(OC_2H_5)_4$, $Zr(O\text{-}n\text{-}C_3H_7)_4$, $Zr(O\text{-}i\text{-}C_3H_7)_4$, $Zr(O\text{-}n\text{-}C_4H_9)_4$, $Zr_2O(O\text{-}i\text{-}C_3H_7)_6$, $Zr(OCH_3)[OC(CH_3)_3]_3$, $Zr_4O_3(OC_2H_5)_{10}$, $Zr(O\text{-}n\text{-}C_4H_9)Cl_3$, $Zr(O\text{-}n\text{-}C_4H_9)_2Cl_2$, $Zr(OC_2H_5)_3Cl$, $Zr(O\text{-}i\text{-}C_3H_7)Cl_3$, $Zr(O\text{-}n\text{-}C_3H_7)Cl_3$, $ZrF_4$, $ZrCl_4$, $ZrOF_2$ and $ZrOCl_2$ may be mentioned. Use of oxygen-containing organic compounds and halogen-containing compounds having different hydrocarbon groups falls within the scope of the present invention.

These oxygen-containing organic compounds are used alone or as a mixture of two or more of them.

As the silicon compound for the reactant (III), the following polysiloxanes and silanes may be used.

As polysiloxanes, siloxane polymers of a linear, cyclic or three-dimensional structure may be mentioned which have repeating units of one or more types of the general formula:

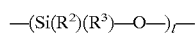

wherein $R^2$ and $R^3$ may be the same or different and each represents an atom or a residual group that can bond to the silicon, for example, a hydrocarbon group such as an alkyl group or an aryl group, having from 1 to 12 carbon atoms, hydrogen, a halogen, or an alkoxy group, an aryloxy group or a fatty acid residue, having from 1 to 12 carbon atoms, and l is usually an integer of from 2 to 10,000, in various proportions and distributions in the molecule, except for the case where $R^2$ and $R^3$ are all hydrogen or halogen.

Specifically, the linear polysiloxanes may, for example, be hexamethyldisiloxane, octamethyltrisiloxane, dimethylpolysiloxane, diethylpolysiloxane, methylethylpolysiloxane, methylhydropolysiloxane, ethylhydropolysiloxane, butylhydropolysiloxane, hexaphenyldisiloxane, octaphenyltrisiloxane, diphenylpolysiloxane, phenylhydropolysiloxane, methylphenylpolysiloxane, 1,5-dichlorohexamethyltrisiloxane, 1,7-dichlorooctamethyltetrasiloxane, dimethoxypolysiloxane, diethoxypolysiloxane, and diphenoxypolysiloxane.

The cyclic polysiloxanes may, for example, be hexamethylcyclotrisiloxane, octamethylcyclotetrasiloxane, decamethylcyclopentasiloxane, 2,4,6-trimethylcyclotrisiloxane, 2,4,6,8-tetramethylcyclotetrasiloxane, triphenyltrimethylcyclotrisiloxane, tetraphenyltetramethylcyclotetrasiloxane, hexaphenylcyclotrisiloxane, and octaphenylcyclotetrasiloxane.

The polysiloxanes having a three-dimensional structure may, for example, be those obtained by heating the above linear or cyclic polysiloxanes to let them have a crosslinked structure.

These polysiloxanes are preferably liquid for the convenience in handling, and it is desirable that they have a viscosity within a range of from 1 to 10,000 centistokes, preferably from 1 to 1,000 centistokes, at 25° C. However, they are not necessarily limited to liquid polysiloxanes, and they may be solid that are generally called silicon grease.

The silanes may, for example, be compounds represented by the general formula $H_rSi_sR^4_tX^2_u$ wherein $R^4$ represents a group that can bond to the silicon, for example, a hydrocarbon group such as an alkyl group or an aryl group, having from 1 to 12 carbon atoms, or an alkoxy group, an aryloxy group or a fatty acid residue, having from 1 to 12 carbon atoms, and the plurality of $R^4$ may be the same or different; the plurality of $X^2$ may be the same or different and each represents a halogen i.e. F, Cl, Br or I; each of r, t and u is an integer of 0 or more, s is a natural number and r+t+u=2s or r+t+u=2s+2.

Specifically, they include, for example, silanhydrocarbons such as trimethylphenylsilane and allyltrimethylsilane, linear and cyclic organic silanes such as hexamethyldisilane and octaphenylcyclotetrasilane, organic silanes such as methylsilane, dimethylsinlane and trimethylsilane, silicon halides such as silicon tetrachloride and silicon tetrabromide, alkyl and aryl halogenosilanes such as dimethyldichlorosilane, diethyldichlorosilane, n-butyltrichlorosilane, diphenyldichlorosilane, triethylfluorosilane and dimethyldibromosilane, alkoxysilanes such as trimethylmethoxysilane, dimethyldiethoxysilane, tetramethoxysilane, tetraethoxysilane, diphenyldiethoxysilane, triphenylethoxysilane, tetramethyldiethoxydisilane and dimethyltetraethoxydisilane, haloalkoxysilanes and halophenoxysilanes such as dichlorodiethoxysilane, dichlorodiphenylsilane and tribromoethoxysilane and silane compounds containing a fatty acid residue such as trimethylacetoxysilane, diethyldiacetoxysilane and ethyltriacetoxysilane.

The above organosilicon compounds may be used alone or two or more of them may be mixed or reacted for use.

As the organoaluminum halide compound for the above-mentioned reactant (IV), those represented by the general formula $AlR^5_kX^3_{3-k}$ may be used. In the formula, $R^5$ represents a hydrocarbon group having from 1 to 20, preferably 1 to 6, carbon atoms, $X^3$ represents a halogen atom, i.e. F, Cl, Br or I, and k is such a number that 0<k<3. It is preferable that $R^5$ is selected from a linear or branched alkyl group, a cycloalkyl group, an arylalkyl group, an aryl group, an alkylaryl group, and an alkoxy group.

The above aluminum halide compounds may be used alone or as a mixture of two or more of them.

Specific examples of the organoaluminum halide compound include ethyl aluminum dichloride, n-propylaluminum dichloride, n-butylaluminum dichloride, i-butylaluminum dichoride, ethylaluminum sesquichloride, i-butylaluminum sesquichloride, i-propylaluminum sesquichloride, n-propylaluminum sesquichloride, diethylaluminum chloride, di-i-propylaluminum chloride, di-n-propylaluminum chloride, di-i-butylaluminum chloride, diethylaluminum bromide, diethylaluminum iodide, dichloromethoxyaluminum and chlorodimethoxyaluminum.

As the halogen-containing compound of titanium for the above-mentioned reactant (V), a titanium compound represented by the general formula $Ti(OR^6)_jX^4_{4-j}$ may be used. In the formula, $R^6$ represents a hydrocarbon group, such as a linear or branched alkyl group, a cycloalkyl group, an arylalkyl group, an aryl group or an alkylaryl group, having from 1 to 20, preferably from 1 to 10, carbon atoms, j is a number such that $0 \leq j < 4$, and $X^4$ represents a halogen atom, i.e. F, Cl, Br or I.

Specific examples of the halogen-containing compound of titanium include titanium tetrachloride, ethoxy titanium trichloride, propoxy titanium trichloride, butoxy titanium trichloride, phenoxy titanium trichloride, diethoxy titanium dichloride and triethoxy titanium chloride. It is possible to use a halogen-containing compound which contains several different hydrocarbon groups.

These halogen-containing compounds of titanium may be used alone or as a mixture of two or more of them.

As the halogen-containing compounds of Groups IIIb and IVb of the Periodic Table for the above reactant (VI), the following compounds containing at least one halogen atom may be mentioned.

Specifically, they include, for example, silicon halides such as silicon tetrachloride, silicon tetrabromide, trimethylchlorosilane, dimethyldichlorosilane, ethyltrichlorosilane, dichlorodibutylsilane, trichlorobutylsilane, diethyldichlorosilane, tribromobutylsilane and bromotrimethylsilane; hydrocarbon halides such as carbon tetrachloride, chloroform, 1,1,1-trichloroethane, 1,2-dichloroethane, dichloromethane and trichlorofluoromethane; aluminum halides such as aluminum trichloride, ethyl aluminum dichloride, n-propylaluminum dichloride, n-butylaluminum dichloride, i-butylaluminum dichloride, ethylaluminum sesquichloride, i-butylaluminum sesquichloride, i-propylaluminum sesquichloride, n-propylaluminum sesquichloride, diethylaluminum chloride, di-i-propylaluminum chloride, di-n-propylaluminum chloride, di-i-butylaluminum chloride, diethylaluminum bromide, and diethylaluminum iodide; and boron halides such as boron trichloride and boron tribromide. Among them, silicon halides, hydrocarbon halides and aluminum halides are preferred, and particularly aluminum halides are most preferred.

These halogen-containing compounds of Groups IIIb and IVb of the Periodic Table may be used alone or as a mixture of two or more of them.

The amounts of the reactants (I), (II), (III), (IV), (V) and (VI) to be used in this invention are not particularly limited, but it is preferred to select the amounts so that the molar ratio of magnesium atom of the reactant (I) to zirconium atom of the reactant (II) will be from 1:0.01 to 1:20, particularly from 1:0.05 to 1:5.

It is preferred to select the amounts so that the ratio of magnesium atom of the reactant (I) to silicon atom of the reactant (III) will be from 1:0.01 to 1:20, preferably from 1:0.05 to 1:5.

It is preferred to select the amounts of the reactants so that the ratio of magnesium atom of the reactant (I) to aluminum atom of the reactant (IV) ranges from 1:0.1 to 1:100, preferably 1:1 to 1:20.

It is preferred to select the amounts of the reactants so that the ratio of magnesium atom of the reactant (I) to titanium atom of the reactant (V) ranges from 1:0.01 to 1:20, preferably 1:0.1 to 1:10. If the ratio is outside this range, problems may arise such that the polymerization activity lowers and the product is colored.

When the halogen-containing compound (VI) of Groups IIIb and IVb of the Periodic Table is used, it is also preferred that the ratio of magnesium atom of the reactant (I) to the halogen-containing compound (VI) of Groups IIIb and IVb of the Periodic Table ranges from 1:0.01 to 1:20, preferably from 1:0.1 to 1:10.

The catalyst preparation reactions are preferably conducted in a liquid medium. Therefore, when these reactants are not liquid by themselves under the operating conditions, or when the amount of liquid reactants is not sufficient, the reaction can be conducted in the presence of an inert organic solvent. As such an inert organic solvent, any solvent which is commonly used in this technical field may be employed. As the solvent, an aliphatic, alicyclic or aromatic hydrocarbon or a halogen derivative thereof, or a mixture thereof may be mentioned. For example, isobutane, hexane, heptane, cyclohexane, benzene, toluene, xylene or monochlorobenzene may be preferably used.

The reaction conditions for obtaining a homogeneous solution from the reactants (I), (II) and (III) are at a temperature of from −50 to 300° C., preferably from 0 to 200° C., for 0.5 to 50 hours, preferably 1 to 6 hours, under an ordinary pressure or an elevated pressure in an inert gas atmosphere. Further, the reaction with the reactant (IV) is conducted at a temperature ranging from −50 to 200° C., preferably from −30 to 100° C., for 0.2 to 50 hours, preferably 0.5 to 5 hours, in an inert gas atmosphere under an ordinary pressure or an elevated pressure.

The solid product thus prepared is particles insoluble in a solvent to be used as a diluent. After separated from remaining unreacted substances and by-products by filtration or decantation, the solid product is washed with an inert solvent several times, then suspended in an inert solvent, and subjected to the contact reactions with the reactant (V) or the reactants (V) and (VI) to obtain a solid catalyst component (A). When the reactants (V) and (VI) are used, the order of addition thereof is optional. Further, it is also possible that after the reactants (V) and/or (VI) are reacted, the solid product is separated from remaining unreacted substances and by-products by filtration or decantation, and washed with an inert solvent several times, and then reacted with the reactants (VI) and/or (V). The reactions with the reactant (V) and the reactant (VI) are conducted at a temperature ranging from −50 to 200° C., preferably from −30 to 100° C., for 0.2 to 50 hours, preferably 0.5 to 5 hours, in an inert gas atmosphere under an ordinary pressure or an elevated pressure.

The solid catalyst component (A) may be used as such, but usually it is used after having the residual unreacted materials and by-products removed by filtration or decantation, washing it with an inert solvent several times, and suspending it in an inert solvent. Also, the one isolated after washing and heated under ordinary pressure or a reduced pressure to remove the solvent can be used.

Further, the solid catalyst component (A) is preferably prepolymerized with 0.01 to 50 g of ethylene or α-olefin having three or more carbon atoms per g of the solid catalyst component (A) in an inert hydrocarbon solvent. The monomer to be used for the prepolymerization may be a single monomer or a combination of two or more monomers. When two or more monomers are used for the prepolymerization, the prepolymerization can be conducted one after another or at the same time. In the prepolymerization, the organoaluminum compound is preferably used in a ratio of from 0.1 to 1000 to the titanium atom in the solid catalyst component (A). An electron donative compound may be used in a proportion of from 0.01 to 10 to the titanium atom in the solid catalyst component (A).

In this invention, as the catalyst component (B), an organoaluminum compound is used.

As the organic group of the catalyst component (B), an alkyl group may be mentioned as a typical example. As the alkyl group, a linear or branched alkyl group having 1 to 20 carbon atoms may be used. Specifically, trimethylaluminum, triethylaluminum, tri-i-butylaluminum, tri-n-butylaluminum, or tri-n-decylaluminum may, for example, be mentioned. It is particularly preferred to use a trialkylaluminum having a linear or branched alkyl group having 1 to 10 carbon atoms. There may also be used one having an alkyl group with 1 to 20 carbon atoms, for example, an alkylaluminum halide such as ethylaluminum sesquichloride, diethylaluminum chloride or diisobutylaluminum chloride, or an alkylaluminum alkoxide such as diethylaluminum ethoxide.

These organoalminum compounds may be used alone or as a mixture of two or more of them.

In the practice of the present invention, the solid catalyst component (A) is used preferably in an amount of from 0.001 to 2.5 mmol in terms of titanium atom per liter of the solvent or per liter of the inner volume of the reactor, and depending on the conditions, a higher concentration may be used.

The organoaluminum compound of the catalyst component (B) is used at a concentration of from 0.02 to 50 mmol, preferably from 0.2 to 5 mmol, per liter of the solvent or per liter of the internal volume of the reactor.

The polymerization of an olefin or of an olefin and other α-olefin is conducted in a liquid phase or a gas phase. The polymerization is conducted under the condition substantially free from oxygen or water in the presence of or the absence of an inert gas.

When the polymerization is conducted in a liquid phase, it is preferable to use an inert solvent. As the inert solvent, any solvent commonly used in this technical field may be used, but particularly an alkane or a cycloalkane having 4 to 20 carbon atoms, for example, isobutane, pentane, hexane, heptane or cyclohexane is suitable. When the polymerization is conducted in a gas phase, it is conducted at a temperature below the melting point of the polymer.

The reactor to be used for the polymerization step may be of any type which is commonly used in this technical field, for example, a fluidized bed reactor or a stirring tank type reactor. When the fluidized bed reactor is used in the gas phase polymerization, the reaction is conducted by blowing an olefin in the gas state and, as the occasion demands, an inert gas into the reaction system, thereby maintaining the reaction system in the state of fluid. As a stirrer when the stirring tank type reactor is used, various type of stirrers can be employed, for example, an anchor type stirrer, a screw type stirrer, a ribbon type stirrer and the like.

The polymerization of the present invention includes not only homopolymerization of an olefin but also copolymerization of an olefin with other α-olefin. As the α-olefin to be used for the polymerization and copolymerization, ethylene, propylene, 1-butene, 1-pentene, 1-hexene, 1-octene, 4-methyl-1-pentene and a mixture thereof are mentioned. Also, copolymerization can be conducted by using a mixture of two or more of the above-mentioned α-olefins. It is necessary to select the amounts of the α-olefins to be used depending on the desired density of an objective polymer. It is possible to produce the polymer of the present invention whose density ranges from 0.890 to 0.970 g/cm$^3$.

The polymerization operation of the present invention can be carried out by not only one stage polymerization which is conducted under a common single polymerization condition, but also multistage polymerization which is conducted under plural polymerization conditions.

The polymerization of the present invention is conducted under polymerization conditions for a slurry or gas phase method at a polymerization temperature below the melting point of the polymer e.g. at a polymerization temperature of from 20 to 100° C., under a polymerization pressure of from 2 to 50 kg/cm$^2$G. The molecular weight can be controlled by a conventional means, e.g. a method in which an appropriate amount of hydrogen is present in a reaction system.

A first effect of the present invention resides in that the improvement of the powder properties of the polymer is remarkable, and that it is suitable particularly for gas phase polymerization as well as for slurry polymerization. That is, according to the present invention, it is possible to obtain a polymer containing no substantial amount of fine particles and having a proper average particle size with a high bulk density. Further, it is also possible to obtain a polymer having an extremely narrow particle size distribution. Therefore, the dispersibility of the polymer in the polymerization system is good. These merits are industrially very significant. That is, in the polymerization step, formation of substances deposited in the polymerization apparatus can be inhibited, separation of the polymer can be facilitated, and scattering of fine particles of the polymer out of the system can be prevented. Further, in the transportation step, no bridge will be formed in the cylo, and troubles involved in the transportation can be eliminated. Further, it becomes possible to provide a polymer having a uniform quality.

The second effect of the present invention is that the polymerization activities are very high, and it is possible to obtain a polymer which does not require a deashing step intended for the removal of the remaining catalyst. Since the catalyst is highly active, the product is free from coloration or odor, and no purification of the polymer will be required. Therefore, this is economically very advantageous.

The third effect of the present invention resides in that the molecular weight distribution can be easily controlled by the amounts of the reactants to be used for the production of the catalyst particularly the ratio of the amounts of the zirconium compound of the reactant (II) to the titanium compound of the reactant (V). Therefore, it is possible to obtain polymers suitable for blow molding or film molding, and to obtain molded products whose surface properties are good.

Now, the present invention will be described in further detail with reference to Examples. However, it should be understood that the present invention is by no means restricted by such specific Examples.

In the Examples and Comparative Examples, HLMI/MI stands for the ratio of the high-load melt index (HLMI; measured under the conditions of JIS K-6760 at 190° C. with a load of 21.6 kg) to the melt index (MI; measured under the conditions of JIS K-6760 at 190° C. with a load of 2.16 kg).

The activity shows the produced amount (g) of a polymer per gram of the solid catalyst component (A).

With respect to the width of the particle size distribution of the polymer particles, the results of the classification of the polymer particles by sieves are plotted on a probability logarithmic paper to find the geometric standard deviation from the approximated straight line in known manner, and the width is expressed in terms of its common logarithm (hereinafter referred to as σ). The average particle size is a value obtained by reading the particle size corresponding to the weight accumulated value 50% of the above approximated line. The content of fine particles shows the ratio of fine particles having a particle size of 105 μm or less by weight %.

A short chain branching coefficient was quantified from a peak derived from a methyl group appeared at around 1378 cm$^{-1}$ in accordance with a Fourier transform infrared spectroscopy (FT-IR). The density was measured in accordance with JIS K-6760.

EXAMPLE 1

(a) Preparation of a Mg—Zr Homogeneous Solution 25 g (1.03 mol) of metal magnesium powder was placed in a 3 l flask equipped with a stirrer, a reflux condenser, a dropping tube and a thermometer, and then 1.25 g of iodine, 153.7 g (2.07 mol) of n-butanol and 246.7 g of a 80% n-butanol solution of zirconium tetrabutoxide (zirconium tetrabutoxide: 0.51 mol, n-butanol: 0.67 mol) were added. Then, the temperature was elevated to 85° C., and the mixture was stirred for 2 hours under sealing with nitrogen while removing the evolved hydrogen gas. Then, the temperature was elevated to 140° C., and the reaction was conducted at that temperature for further 2 hours under sealing with nitrogen. After cooling the mixture to 110° C., a mixture of 31.8 g (0.21 mol) of tetramethoxysilane and 42.6 g (0.20 mol) of tetraethoxysilane was added. Then, the temperature was elevated to 140° C., and the reaction was continued at that temperature for 2 hours under sealing with nitrogen. The mixture was cooled to 110° C., and 1,750 ml of hexane was added thereto, to obtain a homogeneous solution (a Mg—Zr solution) containing magnesium and zirconium.

(b) Preparation of Solid Catalyst Component (A)

The homogeneous solution thus obtained was placed in a 500 ml flask in an amount of 0.066 mol in terms of Mg, and the temperature was kept at 45° C. 152 ml (0.41 mol) of a 50% hexane solution of i-butylaluminum dichloride was added over 2 hours. Then, the temperature was elevated to 70° C., and stirring was continued at 70° C. for 1 hour, to obtain a solid product. Hexane was added to the solid product, and washing was conducted 5 times. 26.5 g (0.14 mol) of titanium tetrachloride was added. Then, the temperature was elevated to 70° C. and reaction was conducted for 1 hour. Hexane was added to the solid product, and washing was conducted 7 times to obtain a solid catalyst component (A).

(c) Polymerization

The internal atmosphere of an electromagnetic stirring type reactor made of stainless steel having an internal volume of 2 l was thoroughly replaced with nitrogen, 1.2 l of hexane was charged thereinto, and the internal temperature was adjusted to 80° C. Thereafter, 0.285 g of triisobutylaluminum as the catalyst component (B) and 31 mg of the solid catalyst component (A) were successively added. The internal pressure of the polymerization reactor was adjusted to 1 kg/cm$^2$G with nitrogen, and then 13.3 kg/cm$^2$ of hydrogen was added. Then, the polymerization was carried out for 1.5 hours, while continuously adding ethylene so that the internal pressure of the autoclave would be 20.0 kg/cm$^2$G. After completion of the polymerization, the reactor was cooled, the unreacted gas was purged, and the polyethylene was taken out and separated from the solvent by filtration, followed by drying.

As a result, 371 g of polyethylene having a melt index of 0.16 g/10 min, an HLMI/MI of 102 and a bulk density of 0.41 g/cm$^3$ was obtained. The catalytic activity corresponds to 11,800 g/g catalyst. The average particle size was 360 μm, the proportion of fine particles was 0.8% by weight, and σ was 0.13.

EXAMPLE 2

The Mg—Zr homogeneous solution obtained in (a) of Example 1 in an amount of 0.041 mol in terms of Mg was placed in a 500 ml-flask, and the temperature was adjusted to 45° C. 106 ml (0.29 mol) of a 50% hexane solution of i-butylaluminum dichloride was added thereto over 2 hours, and then the temperature was elevated to 70° C. and stirring was conducted for 1 hour, to obtain a solid product. The solid product was washed with hexane five times, and then 16.4 g (0.087 mol) of titanium tetrachloride was added thereto. The temperature was elevated to 70° C. and the reaction was conducted for 1 hour. The product was washed with hexane seven times to obtain a solid catalyst component (A). Polymerization of ethylene was carried out under the same condition as in (c) of Example 1 by using the solid catalyst component (A) thus obtained and triisobutylaluminum. The results are shown in Table 1.

COMPARATIVE EXAMPLE 1

A solid catalyst component was prepared by directly reacting the solid obtained by the reaction with the reactant (IV), with the reactant (V) without washing the solid product. That is, 56.1 g of a n-butanol solution of zirconium tetrabutoxide (zirconium tetrabutoxide: 0.13 mol), 22.9 g (0.2 mol) of magnesium diethoxide and 200 ml of hexane were placed in a 1.6 l autoclave equipped with a stirrer, and the temperature was elevated to 120° C. The mixture was stirred for 2 hours under sealing with nitrogen. Then, the temperature was elevated to 120° C., and the mixture was stirred for 2 hours under sealing with nitrogen. Further, 27.3 g of methylphenyl polysiloxane (a viscosity at 25° C.: 100 centistokes, silicon: 0.2 gram atom) was charged under pressure with nitrogen.

Then, stirring was carried out at 120° C. for 1 hour. The temperature was dropped to 45° C., and 353 ml of a 50% hexane solution of ethylaluminum dichloride was added over 3 hours. Without washing the reaction product, 15.1 g (0.08 mol) of TiCl$_4$ was added thereto, and then the mixture was stirred for 1 hour at 60° C. Hexane was added to the product, and washing was conducted 15 times by decantation.

Polymerization of ethylene was carried out under the same conditions as in (c) of Example 1 except that 17 kg/cm$^2$ of hydrogen was added and total pressure was adjusted to 25 kg/cm$^2$G. The results are shown in Table 2, which shows a wide particle size distribution and a large amount of fine particles.

COMPARATIVE EXAMPLE 2

The Mg—Zr homogeneous solution obtained in (a) of Example 1 in an amount of 0.099 mol in terms of Mg was placed in a 1 l-flask, and the temperature was adjusted to 45° C. 258 ml of a 50% hexane solution of i-butylaluminum dichloride (0.69 mol) was added thereto over 2 hours. After completion of the addition, the temperature was elevated to 70° C., and stirring was carried out at that temperature for 1 hour to obtain a solid product. Polymerization of ethylene was carried out under the same conditions as in (c) of Example 1 by using triisobutylaluminum and the solid product. The results are shown in Table 2, but the catalytic activity was low.

EXAMPLE 3

5.88 g of the solid catalyst component (A) obtained in (b) of Example 1 was suspended in 400 ml of hexane, and 3.69 g of triethylaluminum and 0.23 g of diphenyldimethoxysilane were added thereto. Then, propylene was supplied to the mixture while maintaining the pressure at 1 to 2 kg/cm$^2$G at a temperature of 30° C., whereby 58.8 g of propylene was reacted for prepolymerizing the solid catalyst component (A) with propylene.

The internal atmosphere of an electromagnetic stirring type reactor made of stainless steel having an internal volume of 2 l was thoroughly replaced with nitrogen, 200 g of sodium chloride which was dried at 200° C. for 30 hours was introduced as a dispersion medium, and the internal temperature was adjusted to 80° C. Then, 0.51 g of triisobutylaluminum as a catalyst component (B) and 265 mg of the above catalyst which was obtained by prepolymerizing the solid catalyst component (A) with propylene (containing 24 mg of the solid catalyst component (A)) were successively added. The internal pressure of the polymerization reactor was adjusted to 1 kg/cm$^2$G with nitrogen, and 14.0 kg/cm$^2$ of hydrogen was added. Then, the polymerization was carried out for 1.5 hours, while continuously adding ethylene so that the internal pressure of the autoclave would be 21.0 kg/cm$^2$G. After completion of the polymerization, the mixture was cooled, the unreacted gas was purged, and a mixture of the produced polymer and sodium chloride was taken out. The mixture was washed with pure water to dissolve the sodium chloride and then dried to obtain the polymer.

As a result, 93 g of the polymer having a melt index of 0.64 g/10 min and an HLMI/MI of 89 was obtained. The catalytic activity corresponded to 3900 g/g catalyst. As a result, the bulk density was 0.44 g/cm$^3$, the average particle size was 290 μm, the content of fine particles was 1.9%, and σ was 0.14.

EXAMPLE 4

The internal atmosphere of an electromagnetic stirring type reactor made of stainless steel having an internal volume of 2 liters was thoroughly replaced with nitrogen, 200 g of sodium chloride which was dried at 200° C. for 30 hours was introduced as a dispersion medium, and the internal temperature was adjusted to 80° C. Then, 0.29 g of triisobutylaluminum as a catalyst component (B) and 281 mg of the catalyst obtained in Example 3 by prepolymerizing the solid catalyst component (A) with propylene (containing 26 mg of the solid catalyst component (A)) were successively added thereto. The internal atmosphere of the polymerization reactor was adjusted to 1 kg/cm$^2$G with nitrogen, and hydrogen was added so that the internal pressure would be adjusted to 6.0 kg/cm². Then, polymerization was carried out for 1.5 hours, while adjusting butene-1/ethylene (molar ratio) in the gas phase to 0.20 and continuously adding ethylene and butene-1 so that the internal pressure of the autoclave would be adjusted to 21.0 kg/cm²G. After completion of the polymerization, the reactor was cooled, the unreacted gas was purged, and a mixture of the produced polymer and the sodium chloride was taken out. The mixture was washed with pure water to dissolve sodium chloride and then dried to obtain the polymer.

As a result, 155 g of the polymer having a melt index of 0.51 g/10 min and an HLMI/MI of 56 was obtained. The catalytic activity corresponded to 6100 g/g catalyst. The bulk density was 0.43 g/cm³, the average particle size was 400 μm, the content of fine particles was 0.5%, and σ was 0.20. Also, the density was 0.921 g/cm³ and the ethyl branching number was 18.2 per 1000 C.

EXAMPLE 5

(a) Preparation of a Mg—Zr Homogeneous Solution 25 g (1.03 mol) of metal magnesium powder was placed in a 3 l flask equipped with a stirrer, a reflux condenser, a dropping tube and a thermometer, and then 1.25 g of iodine, 161.9 g (2.19 mol) of n-butanol and 200.4 g of a 80% n-butanol solution of zirconium tetrabutoxide (zirconium tetrabutoxide: 0.42 mol, n-butanol: 0.52 mol) were added. Then, the temperature was elevated to 85° C., and the mixture was stirred for 2 hours under sealing with nitrogen while removing the evolved hydrogen gas. Then, the temperature was elevated to 140° C., and the reaction was conducted at that temperature for further 2 hours under sealing with nitrogen. After cooling the mixture to 110° C., a mixture of 32.2 g (0.21 mol) of tetramethoxysilane and 46.1 g (0.22 mol) of tetraethoxysilane was added. Then, the temperature was elevated to 140° C., and the reaction was continued at that temperature for 2 hours under sealing with nitrogen. The mixture was cooled to 110° C., and 1750 ml of hexane was added thereto, to obtain a homogeneous solution (a Mg—Zr solution) containing magnesium and zirconium.

(b) Preparation of Solid Catalyst Component (A)

The homogeneous solution thus obtained was placed in a 500 ml flask in an amount of 0.051 mol in terms of Mg, and the temperature was kept at 45° C. After 104 ml (0.28 mol) of a 50% hexane solution of i-butylaluminum dichloride was added over 2 hours, the temperature was elevated to 70° C., at which stirring was continued for 1 hour, to obtain a solid product. Hexane was added to the product, and washing was conducted 5 times.

After 19.7 g (0.10 mol) of titanium tetrachloride was added to the solid product, the temperature was elevated to 70° C., and the reaction was conducted at that temperature for 1 hour. Hexane was added to the product, and washing was conducted 7 times, to obtain a solid catalyst component (A).

(c) Polymerization

Polymerization of ethylene was conducted by using the solid catalyst component (A) and triisobutylaluminum under the same conditions as in (c) of Example 1. The results are shown in Table 1.

EXAMPLE 6

The solid catalyst component (A) obtained in (b) of Example 5 was prepolymerized with propylene under the same conditions as in Example 3.

Polymerization of ethylene was carried out under the same conditions as in Example 3 by using triisobutylaluminum and the catalyst which was obtained by prepolymerizing the solid catalyst component (A) with propylene, as mentioned above. The results are shown in Table 3.

EXAMPLE 7

Copolymerization of ethylene and butene-1 was carried out, under the same conditions as in Example 4, by using triisobutylaluminum and the catalyst obtained in Example 6 by prepolymerizing the solid catalyst component (A) with propylene. The results are shown in Table 3.

EXAMPLE 8

25 g (1.03 mol) of metal magnesium powder was placed in a 3 l flask equipped with a stirrer, a reflux condenser, a dropping tube and a thermometer, and then 1.25 g of iodine, 115.0 g (1.55 mol) of n-butanol and 234.5 g of a 70% propanol solution of zirconium tetrapropoxide (zirconium tetrapropoxide: 0.50 mol, propanol: 1.17 mol) were added. Then, the temperature was elevated to 85° C., and the mixture was stirred for 2 hours under sealing with nitrogen while removing the evolved hydrogen gas. Then, the temperature was elevated to 140° C., and the reaction was conducted at that temperature for further 2 hours under sealing with nitrogen. After cooling the mixture to 110° C., a mixture of 31.8 g (0.21 mol) of tetramethoxysilane and 42.6 g (0.20 mol) of tetraethoxysilane was added. Then, the temperature was elevated to 140° C., and the reaction was continued at that temperature for 2 hours under sealing with nitrogen. The mixture was cooled to 110° C., and 1,750 ml of hexane was added thereto, to obtain a homogeneous solution (a Mg—Zr solution) containing magnesium and zirconium.

Subsequent operations were conducted in the same manner as in Example 1 to obtain a solid catalyst component (A). Polymerization of ethylene was carried out, in the same manner as in (c) of Example 1, by using the solid catalyst component (A) and triisobutylaluminum. The results are shown in Table 1.

EXAMPLES 9 AND 10

Preparation of a solid catalyst component (A) was carried out in the same manner as in Example 1 except that the compound as the reactant (III), which was used for the preparation of the solid catalyst component (A), was changed. Namely, dimethylpolysiloxane was used in Example 9 and methylhydropolysiloxane was used in Example 10, respectively, to prepare solid catalyst components (A). Polymerization of ethylene was carried out under the same conditions as in Example 1 by using either one of these solid catalyst components (A) and triisobutylaluminum. The results are shown in Table 1.

EXAMPLES 11 AND 12

Preparation of a solid catalyst component (A) was carried out in the same manner as in Example 1 except that the compound as the reactant (IV), which was used for the preparation of the solid catalyst component (A), was changed. Namely, ethylaluminum dichloride was used in Example 11 and ethylaluminum sesquichloride was used in Example 12, respectively, to prepare solid catalyst components (A). Polymerization of ethylene was carried out under the same conditions as in Example 1 by using either one of these catalyst components (A) and triisobutylaluminum. The results are shown in Table 1.

EXAMPLE 13

(a) Preparation of a Mg—Zr Homogeneous Solution

The Mg—Zr homogeneous solution obtained in (a) of Example 1 in an amount of 0.185 mol in terms of Mg was placed in a 1 l flask, and the temperature was kept at 45° C. 312 ml (0.84 mol) of a 50% hexane solution of i-butylaluminum dichloride was added over 2 hours, and then the temperature was elevated to 70° C. Stirring was continued at 70° C. for 1 hour, to obtain a solid product. Hexane was added to the solid product, and washing was conducted 5 times.

A slurry containing the solid product was kept at 45° C., and 138 ml (0.37 mol) of a 50% hexane solution of i-butylaluminum dichloride was added over 1 hour. After completion of the addition, the temperature was elevated to 70° C., and the reaction was conducted at that temperature for 1 hour. Hexane was added to the product, and washing was conducted 5 times. Then, 71.9 g (0.38 mol) of titanium tetrachloride was added, and the temperature was elevated to 70° C. The reaction was conducted at 70° C. for 1 hour. Hexane was added to a product, and washing was conducted 7 times to obtain a solid catalyst component (A). Polymerization of ethylene was conducted under the same conditions as in (c) of Example 1 by using the solid catalyst component (A) and triisobutylaluminum. The results are shown in Table 4.

EXAMPLE 14

The Mg—Zr homogeneous solution obtained in (a) of Example 1 in an amount of 0.070 mol in terms of Mg was placed in a 500 ml flask, and the temperature was kept at 45° C. 128 ml (0.35 mol) of a 50% hexane solution of i-butylaluminum dichloride was added over 2 hours, and then the temperature was elevated to 70° C. Stirring was continued at 70° C. for 1 hour, to obtain a solid product. Hexane was added to the product, and washing was conducted 5 times.

A slurry containing the solid product was kept at 45° C., and 52 ml (0.14 mol) of a 50% hexane solution of i-butylaluminum dichloride was added over 1 hour. After completion of the addition, the temperature was elevated to 70° C., and the reaction was conducted at that temperature for 1 hour. Hexane was added to the product, and washing was conducted 5 times. Then, 26.5 g (0.14 mol) of titanium tetrachloride was added, and the temperature was elevated to 70° C. The reaction was conducted at 70° C. for 1 hour. Hexane was added to a product, and washing was conducted 7 times to obtain a solid catalyst component (A). Polymerization of ethylene was conducted under the same conditions as in (c) of Example 1 by using the solid catalyst component (A) and triisobutylaluminum. The results are shown in Table 4.

EXAMPLE 15

The Mg—Zr homogeneous solution obtained in (a) of Example 1 was placed in a 500 ml flask in an amount of 0.073 mol in terms of Mg, and the temperature was kept at 45° C. 107 ml (0.29 mol) of a 50% hexane solution of i-butylaluminum dichloride was added over 2 hours, and then, the temperature was elevated to 70° C. Stirring was continued at 70° C. for 1 hour, to obtain a solid product. Hexane was added to the product, and washing was conducted 5 times.

A slurry containing the solid product was kept at 45° C., and 54 ml (0.15 mol) of a 50% hexane solution of i-butylaluminum dichloride was added over 1 hour. After completion of the addition, the temperature was elevated to 70° C., and the reaction was conducted at that temperature for 1 hour. Hexane was added to the product, and washing was conducted 5 times. Then, 28.1 g (0.15 mol) of titanium tetrachloride was added, and the temperature was elevated to 70° C. The reaction was conducted at 70° C. for 1 hour. Hexane was added to a product, and washing was conducted 7 times to obtain a solid catalyst component (A). Polymerization of ethylene was conducted under the same conditions as in (c) of Example 1 by using the solid catalyst component (A) and triisobutylaluminum except that 4.0 kg cm$^2$ of hydrogen was added and the total pressure was adjusted at 11.0 kg/cm$^2$G. The results are shown in Table 4.

Comparative Example 3

After the solid product was obtained by the reaction with the reactant (IV), the subsequent reaction was proceeded without washing the solid, to prepare a solid catalyst component. That is, the Mg—Zr homogeneous solution obtained in (a) of Example 1 was placed in a 1 l flask in an amount of 0.100 mol in terms of Mg. The temperature was adjusted to 45° C., and 257 ml (0.69 mol) of a 50% hexane solution of i-butylaluminum dichloride was added over 3 hours. After completion of the addition, the temperature was elevated to 70° C. Stirring was conducted at 70° C. for 1 hour, to obtain a solid product. A slurry containing the solid product was adjusted to 45° C., and 5.9 g (0.031 mol) of titanium tetrachloride was added. The temperature was elevated to 70° C. The reaction was conducted at 70° C. for 1 hour. Hexane was added to a product, and the product was washed 7 times to obtain a solid catalyst component. Polymerization of ethylene was conducted under the same conditions as in (c) of Example 1 by using this solid catalyst component and triisobutylaluminum. The results are shown in Table 2, but the particle size distribution was wide and the content of fine particles was large.

Comparative Example 4

9 g (0.37 mol) of metal magnesium powder was placed in a 1 l flask equipped with a stirrer, a reflux condenser, a dropping tube and a thermometer, and then 0.45 g of iodine, 57.7 g (0.78 mol) of n-butanol and 70.3 g of a 80% n-butanol solution of zirconium tetrabutoxide (zirconium tetrabutoxide: 0.15 mol, n-butanol: 0.19 mol) were added. Then, the temperature was elevated to 85° C., and the mixture was stirred for 2 hours under sealing with nitrogen while removing the evolved hydrogen gas. Then, the temperature was evolved to 140° C., and the reaction was conducted at that temperature for further 2 hours under sealing with nitrogen. After cooling the mixture to 110° C., 630 ml of hexane was added without adding the silicon compound as the reactant (III), to obtain a homogeneous solution (a Mg—Zr solution) containing magnesium and zirconium.

Then, the homogeneous solution thus obtained was placed in a 500 ml flask in an amount of 0.055 mol in terms of Mg, and the temperature was adjusted to 45° C. 114 ml (0.31 mol) of a 50% hexane solution of i-butylaluminum dichloride was added over 2 hours, and then, the temperature was elevated to 70° C. Stirring was continued at 70° C. for 1 hour, to obtain a solid product. Hexane was added to the solid product, and washing was conducted 5 times. A slurry containing the solid product was kept at 45° C., and 41 ml (0.11 mol) of a 50% hexane solution of i-butylaluminum dichloride was added over 1 hour. After completion of the addition, the temperature was elevated to 70° C. Stirring was conducted for 1 hour. Hexane was added to the product, and the product was washed 5 times. Then, 53.7 g (0.28 mol) of titanium tetrachloride was added, and the temperature was elevated to 70° C. The reaction was conducted at 70° C. for 1 hour. Hexane was added to the product, and the product was washed 7 times, to obtain a solid catalyst component.

Polymerization of ethylene was carried out under the same conditions as in (c) of Example 1 by using this solid catalyst component and triisobutylaluminum. The results are shown in Table 2, but the bulk density was low and the content of fine particles was large.

EXAMPLE 16

2.56 g of the solid catalyst component (A) obtained in Example 14 was suspended in 400 ml of hexane, and 2.12 g of triethylaluminum and 0.14 g of diphenyldimethoxysilane were added thereto. Then, propylene was supplied to the mixture while maintaining the pressure at 1 to 2 kg/cm$^2$G at a temperature of 30° C., whereby 25.6 g of propylene was reacted for prepolymerizing the solid catalyst component (A) with propylene.

The internal atmosphere of an electromagnetic stirring type reactor made of stainless steel having an internal volume of 2 l was thoroughly replaced with nitrogen, 200 g of sodium chloride which was dried at 200° C. for 30 hours was introduced as a dispersion medium, and the internal temperature was adjusted to 80° C. Then, 0.15 g of triisobutylaluminum as a catalyst component (B) and 313 mg of the catalyst which was obtained by prepolymerizing the solid catalyst component (A) with propylene (containing 28 mg of the solid catalyst component (A)) were successively added. The internal pressure of the polymerization reactor was adjusted to 1 kg/cm$^2$G with nitrogen, and 14.0 kg/cm$^2$ of hydrogen was added. Then, the polymerization was carried out for 1.5 hours, while continuously adding ethylene so that the internal pressure of the autoclave would be 21.0 kg/cm$^2$G. After completion of the polymerization, the mixture was cooled, the unreacted gas was purged, and a mixture of the produced polymer and the sodium chloride was taken out. The mixture was washed with pure water to dissolve the sodium chloride and then dried to obtain the polymer.

As a result, 127 g of the polymer having a melt index of 0.42 g/10 minutes and an HLMI/MI of 101 was obtained. The catalytic activity corresponded to 4,400 g/g catalyst. As a result, the bulk density was 0.48 g/cm$^3$, the average particle size was 330 μm, the content of fine particles was 0.9%, and a was 0.20.

EXAMPLE 17

Polymerization was carried out in the same manner as in Example 16 except that the amount of hydrogen was changed. That is, while in Example 16, hydrogen was used in an amount of 14.0 kg/cm$^2$, in Example 17, it was used in an amount of 12.0 kg/cm$^2$. The results are shown in Table 5.

EXAMPLE 18

The internal atmosphere of an electromagnetic stirring type reactor made of stainless steel having an internal volume of 2 l was replaced thoroughly with nitrogen, and 200 g of sodium chloride dried at 200° C. for 30 hours was introduced as a dispersion medium, and the internal temperature was adjusted to 80° C. Thereafter, 0.14 g of triisobutylaluminum as a catalyst component (B) and 168 mg of the catalyst obtained in Example 16 by prepolymerizing the solid catalyst component (A) with propylene (containing 15 mg of the solid catalyst component (A)) were successively added thereto. The internal atmosphere of the polymerization reactor was adjusted to 1 kg/cm$^2$G with nitrogen, and hydrogen was added so that the internal pressure would be adjusted to 6.0 kg/cm$^2$. Then, polymerization was carried out for 1.5 hours, while adjusting butene-1/ethylene (molar ratio) in the gas phase to 0.25 and continuously adding ethylene and butene-1 so that the internal pressure of autoclave would be adjusted to 21.0 kg/cm$^2$G. After completion of the polymerization, the reactor was cooled, the unreacted gas was purged, and a mixture of the produced polymer and the sodium chloride was taken out. The mixture was washed with pure water to dissolve sodium chloride and then dried to obtain a polymer.

As a result, 262 g of a polymer having a melt index of 0.65 g/10 minutes and an HLMI/MI of 55 was obtained. The catalytic activity corresponded to 17,200 g/g catalyst. The bulk density was 0.41 g/cm$^3$, the average particle size was 430 μm, the content of fine particles was 0.1%, and δ was 0.18. Further, the density was 0.925 g/cm$^3$ and the ethyl branching number was 15.0 per 1,000 C.

EXAMPLE 19

(a) Preparation of a Mg—Zr Homogeneous Solution 25 g (1.03 mol) of metal magnesium powder was placed in a 3 l flask equipped with a stirrer, a reflux condenser, a dropping tube and a thermometer, and then 1.25 g iodine, 167.4 g (2.26 mol) of n-butanol and 197.2 g of a 80% n-butanol solution of zirconium tetrabutoxide (zirconium tetrabutoxide: 0.41 mol, n-butanol: 0.53 mol) were added. Then, the temperature was elevated to 85° C., and the mixture was stirred for 2 hours under sealing with nitrogen while removing the evolved hydrogen gas. Then, the temperature was elevated to 140° C., and the reaction was conducted at that temperature for further 2 hours under sealing with nitrogen. After cooling the mixture to 110° C., a mixture of 35.2 g (0.23 mol) of tetramethoxysilane and 46.4 g (0.22 mol) of tetraethoxysilane was added. Then, the temperature was elevated to 140° C., and the reaction was continued at that temperature for 2 hours under sealing with nitrogen. The mixture was cooled to 110° C., and 1,750 ml of hexane was added thereto, to obtain a homogeneous solution (a Mg—Zr solution) containing magnesium and zirconium.

(b) Preparation of Solid Catalyst Component (A)

The homogeneous solution thus obtained was placed in a 500 ml flask in an amount of 0.078 mol in terms of Mg, and the temperature was adjusted to 45° C. 189 ml (0.51 mol) of a 50% hexane solution of i-butylaluminum dichloride was added over 2 hours, and then, the temperature was elevated to 70° C. Stirring was continued at 70° C. for 1 hour, to obtain a solid product. Hexane was added to the solid product, and washing was conducted 5 times. A slurry containing the solid product was kept at 45° C., and 58 ml (0.16 mol) of a 50% hexane solution of i-butylaluminum dichloride was added over 1 hour. After completion of the addition, the temperature was elevated to 70° C., and stirring was conducted at that temperature for 1 hour. Hexane was added to the product, and washing was conducted 5 times. Then, 30.5 g (0.16 mol) of titanium tetrachloride was added, and the temperature was elevated to 70° C. at which the reaction was conducted for 1 hour. Hexane was added to the product, and washing was conducted 7 times to obtain a solid catalyst component (A).

(c) Polymerization

Polymerization of ethylene was conducted under the same conditions as in (c) of Example 1 by using the solid catalyst component (A) and triisobutylaluminum. The results are shown in Table 4.

EXAMPLE 20

The solid catalyst component (A) obtained in (b) of Example 19 was prepolymerized with propylene under the same conditions as in Example 16. Polymerization of ethylene was conducted under the same conditions as in Example 16 by using triisobutylaluminum and this catalyst obtained by prepolymerizing the solid catalyst component (A) with propylene. The results are shown in Table 5.

EXAMPLE 21

Copolymerization of ethylene and butene-1 was conducted under the same conditions as in Example 18 by using triisobutylaluminum and the catalyst obtained in Example 20 by prepolymerizing the solid catalyst component (A) with propylene. The results are shown in Table 5.

EXAMPLE 22

The Mg—Zr homogeneous solution obtained in (a) of Example 19 was placed in a 500 ml flask in an amount of 0.097 mol in terms of Mg, and the temperature was kept at 45° C. 217 ml (0.58 mol) of a 50% hexane solution of i-butylaluminum dichloride was added over 2 hours, and then, the temperature was elevated to 70° C. Stirring was continued at 70° C. for 1 hour, to obtain a solid product. Hexane was added to the solid product, and washing was conducted 5 times. A slurry containing the solid product was kept at 45° C., and 18 ml (0.048 mol) of a 50% hexane solution of i-butylaluminum dichloride was added thereto. The temperature was elevated to 70° C., and stirring was conducted at that temperature for 1 hour. The reaction product was adjusted to 45° C., and 4.4 g (0.023 mol) of titanium tetrachloride was added. Then, the temperature was elevated to 70° C., and reaction was conducted at that temperature for 1 hour. Hexane was added to the product, and washing was conducted 7 times, thereby obtaining a solid catalyst component (A). Polymerization of ethylene was conducted under the same conditions as in (c) of Example 1 by using this solid catalyst component (A) and triisobutylaluminum. The results are shown in Table 4.

EXAMPLE 23

The Mg—Zr homogeneous solution obtained in (a) of Example 19 was placed in a 500 ml flask in an amount of 0.076 mol in terms of Mg, and the temperature was adjusted to 45° C. 169 ml (0.45 mol) of a 50% hexane solution of i-butylaluminum dichloride was added over 2 hours, and then, the temperature was elevated to 70° C. Stirring was conducted at 70° C. for 1 hour, to obtain a solid product. Hexane was added to the solid product, and washing was conducted 5 times. A slurry containing the solid product was kept at 45° C., and 3.6 g (0.019 mol) of titanium tetrachloride was added thereto. The temperature was elevated to 70° C. The reaction was conducted at 70° C. for 1 hour. The reaction product was kept at 45° C., and 16 ml (0.042 mol) of a 50% hexane solution of i-butylaluminum dichloride was added thereto, and then the temperature was elevated to 70° C. Stirring was conducted at 70° C. for 1 hour. Hexane was added to the product, and washing was conducted 7 times, to obtain a solid catalyst component (A). Polymerization of ethylene was conducted under the same conditions as in (c) of Example 1 by using this solid catalyst component (A) and triisobutylaluminum. The results are shown in Table 4.

EXAMPLE 24

25 g (1.03 mol) of metal magnesium powder was placed in a 3 l flask equipped with a stirrer, a reflux condenser, a dropping tube and a thermometer, and then 1.25 g of iodine, 115.0 g (1.55 mol) of n-butanol and 234.5 g of a 70% propanol solution of zirconium tetrapropoxide (zirconium tetrapropoxide: 0.50 mol, propanol: 1.17 mol) were added. Then, the temperature was elevated to 85° C., and the mixture was stirred for 2 hours under sealing with nitrogen while removing the evolved hydrogen gas. Then, the temperature was elevated to 140° C., and the reaction was conducted at that temperature for further 2 hours under sealing with nitrogen. After cooling the mixture to 110° C., a mixture of 31.8 g (0.21 mol) of tetramethoxysilane and 42.6 g (0.20 mol) of tetraethoxysilane was added. Then, the temperature was elevated to 140° C., and the reaction was continued at that temperature for 2 hours under sealing with nitrogen. The mixture was cooled to 110° C., and 1,750 ml of hexane was added thereto, to obtain a homogeneous solution (a Mg—Zr solution) containing magnesium and zirconium.

Subsequent operations were conducted in the same manner as in Example 1 to obtain a solid catalyst component (A). Polymerization of ethylene was carried out under the same conditions as in (c) of Example 1 by using this solid catalyst component (A) and triisobutylaluminum. The results are shown in Table 4.

EXAMPLES 25 AND 26

Preparation of a solid catalyst component (A) was carried out in the same manner as in Example 1 except that the compound as the reactant (III), which was used for the preparation of the solid catalyst component (A), was changed. Namely, dimethylpolysiloxane was used in Example 25 and methylhydropolysiloxane was used in Example 26, respectively, to prepare solid catalyst components (A). Polymerization of ethylene was carried out under the same conditions as in Example 1 by using the solid catalyst component (A) and triisobutylaluminum. The results are shown in Table 4.

EXAMPLES 27 AND 28

Preparation of a solid catalyst component (A) was carried out in the same manner as in Example 1 except that the compound as the reactant (IV), which was used for the preparation of the solid catalyst component (A), was changed. Namely, ethylaluminum dichloride was used in Example 27 and ethylaluminum sesquichloride was used in Example 28, respectively, to prepare solid catalyst components (A). Polymerization of ethylene was carried out under the same conditions as in Example 1 by using the solid catalyst component (A) and triisobutylaluminum. The results are shown in Table 4.

EXAMPLES 29 AND 30

Preparation of a solid catalyst component (A) was carried out in the same manner as in Example 1 except that the compound as the reactant (VI), which was used for the preparation of the solid catalyst component (A), was changed. Namely, 1,2-dichloroethane was used in Example 29 and silicon tetrachloride was used in Example 30, respectively, to prepare solid catalyst components (A). Polymerization of ethylene was carried out under the same conditions as in Example 1 by using the solid catalyst component (A) and triisobutylaluminum. The results are shown in Table 4.

TABLE 1

| | Activity (g/g) | MI (g/10 min) | HLMI/MI | Bulk density (g/cm$^3$) | Content of fine particles (wt %) | σ | Average particle size (μm) |
|---|---|---|---|---|---|---|---|
| Example 1 | 11800 | 0.16 | 102 | 0.41 | 0.8 | 0.13 | 360 |
| Example 2 | 12600 | 0.08 | 114 | 0.38 | 0.5 | 0.09 | 355 |
| Example 5 | 12400 | 0.45 | 100 | 0.40 | 1.5 | 0.10 | 330 |
| Example 8 | 11200 | 0.37 | 100 | 0.38 | 1.1 | 0.13 | 370 |
| Example 9 | 11500 | 0.24 | 92 | 0.36 | 1.0 | 0.15 | 365 |
| Example 10 | 11000 | 0.10 | 97 | 0.37 | 1.2 | 0.13 | 350 |
| Example 11 | 14800 | 0.52 | 86 | 0.37 | 1.4 | 0.16 | 380 |
| Example 12 | 10700 | 0.87 | 89 | 0.39 | 1.1 | 0.15 | 330 |

TABLE 2

| | Activity (g/g) | MI (g/10 min) | HLMI/MI | Bulk density (g/cm$^3$) | Content of fine particles (wt %) | σ | Average particle size (μm) |
|---|---|---|---|---|---|---|---|
| Comparative Example 1 | 5000 | 0.31 | 96 | 0.33 | 11.5 | 0.30 | 330 |
| Comparative Example 2 | 4800 | 0.004 | 88 | 0.38 | 1.4 | 0.09 | 320 |
| Comparative Example 3 | 5200 | 0.23 | 111 | 0.35 | 8.0 | 0.30 | 400 |
| Comparative Example 4 | 9200 | 0.16 | 111 | 0.21 | 17.6 | 0.17 | 140 |

TABLE 3

| | Activity (g/g) | MI (g/10 min) | HLMI/MI | Bulk density (g/cm$^3$) | Content of fine particles (wt %) | σ | Average particle size (μm) | Density (g/cm$^3$) | Ethyl branching number (number/1000° C.) |
|---|---|---|---|---|---|---|---|---|---|
| Example 3 | 3900 | 0.64 | 89 | 0.44 | 1.9 | 0.14 | 290 | — | — |
| Example 4 | 6100 | 0.51 | 56 | 0.43 | 0.5 | 0.20 | 400 | 0.921 | 18.2 |
| Example 6 | 3600 | 0.21 | 85 | 0.40 | 1.2 | 0.10 | 350 | — | — |
| Example 7 | 5400 | 0.43 | 74 | 0.41 | 0.2 | 0.14 | 430 | 0.924 | 16.8 |

TABLE 4

| | Activity (g/g) | MI (g/10 min) | HLMI/MI | Bulk density (g/cm$^3$) | Content of fine particles (wt %) | σ | Average particle size (μm) |
|---|---|---|---|---|---|---|---|
| Example 13 | 15800 | 0.47 | 113 | 0.40 | 1.0 | 0.14 | 295 |
| Example 14 | 9800 | 0.12 | 152 | 0.40 | 1.4 | 0.12 | 240 |
| Example 15 | 29000 | 0.27 | 61 | 0.42 | 1.1 | 0.15 | 285 |
| Example 19 | 14000 | 0.20 | 120 | 0.38 | 0.7 | 0.14 | 280 |
| Example 22 | 12800 | 0.24 | 139 | 0.38 | 0.5 | 0.14 | 380 |
| Example 23 | 13800 | 0.46 | 120 | 0.36 | 1.3 | 0.15 | 360 |
| Example 24 | 15000 | 0.66 | 111 | 0.39 | 1.1 | 0.14 | 300 |
| Example 25 | 15400 | 0.52 | 102 | 0.38 | 0.9 | 0.15 | 310 |
| Example 26 | 16200 | 0.33 | 118 | 0.39 | 1.2 | 0.14 | 315 |
| Example 27 | 19000 | 0.71 | 95 | 0.37 | 1.5 | 0.16 | 345 |
| Example 28 | 13400 | 0.78 | 93 | 0.38 | 1.0 | 0.13 | 290 |
| Example 29 | 12600 | 0.44 | 92 | 0.40 | 1.4 | 0.13 | 320 |
| Example 30 | 13000 | 0.50 | 84 | 0.38 | 1.1 | 0.15 | 285 |

TABLE 5

|  | Activity (g/g) | MI (g/10 min) | HLMI/MI | Bulk density (g/cm³) | Content of fine particles (wt %) | Average particle size | | Density (g/cm³) | Ethyl branching number (number/ 1000° C.) |
|---|---|---|---|---|---|---|---|---|---|
|  |  |  |  |  |  | σ | (μm) |  |  |
| Example 16 | 4400 | 0.42 | 101 | 0.48 | 0. | 0.20 | 330 | — | — |
| Example 17 | 7800 | 0.11 | 128 | 0.50 | 0.7 | 0.19 | 330 | — | — |
| Example 18 | 17200 | 0.65 | 55 | 0.41 | 0.1 | 0.18 | 430 | 0.925 | 15.0 |
| Example 20 | 5200 | 0.20 | 91 | 0.50 | 0.6 | 0.20 | 350 | — | — |
| Example 21 | 23200 | 1.04 | 51 | 0.46 | 0.2 | 0.17 | 370 | 0.923 | 17.0 |

What is claimed is:

1. A method for producing a polyolefin comprising polymerizing ethylene or ethylene and other α-olefin in the presence of a catalyst comprising a transition metal compound and an organometallic compound, wherein a catalyst system is used which comprises:
   (A) a solid catalyst component prepared by reacting a homogeneous solution containing
      (I) metal magnesium and a hydroxylated organic compound,
      (II) at least one zirconium compound of the formula $Zr(OR^1)_4$, wherein $R^1$ is a hydrocarbon group having 1 to 20 carbon atoms, and
      (III) at least one silane of the formula $Si(OR^4)_4$ wherein $R^4$ is a hydrocarbon group having 1 to 12 carbon atoms, with
      (IV) at least one organoaluminum halide compound to obtain a solid product, isolating the solid product, and reacting this solid product with
      (V) $TiX_4$, wherein X is a halogen atom, and
   (B) at least one organoaluminum compound, wherein
      the ratio of magnesium atom of reactants (I) to zirconium atom of reactant (II) is from 1:0.05 to 1:5,
      the ratio of magnesium atom of reactant (I) to silicon atom of reactant (III) is from 1:0.05 to 1:5,
      the ratio of magnesium atom of reactant (I) to aluminum atom of reactant (IV) is from 1:1 to 1:20, and
      the ratio of magnesium atom of reactant (I) to titanium atom of reactant (V) is from 1:0.1 to 1:10.

2. The method according to claim 1, wherein:
   reactant (I) is metal magnesium and n-butanol,
   reactant (II) is a zirconium tetrabutoxide,
   reactant (III) is tetramethoxysilane and tetraethoxysilane,
   reactant (IV) is i-butylaluminum dichloride, and
   reactant (V) is titanium tetrachloride.

3. A method for producing a polyolefin comprising polymerizing ethylene or ethylene and other α-olefin in the presence of a catalyst comprising a transition metal compound and an organometallic compound, wherein a catalyst system is used which comprises:
   (A) a solid catalyst component prepared by reacting a homogeneous solution containing
      (I) metal magnesium and a hydroxylated organic compound,
      (II) at least one zirconium compound of the formula $Zr(OR^1)_4$, wherein $R^1$ is a hydrocarbon group having 1 to 20 carbon atoms, and
      (III) at least one silane of the formula $Si(OR^4)_4$ wherein $R^4$ is a hydrocarbon group having 1 to 12 carbon atoms, with
      (IV) at least one organoaluminum halide compound to obtain a solid product, isolating the solid product, and reacting this solid product with
      (V) $TiX_4$, wherein X is a halogen atom, and
      (VI) at least one compound selected from the group consisting of silicon halides, hydrocarbon halides, aluminum halides and boron halides, and
   (B) at least one organoaluminum compound, wherein
      the ratio of magnesium atom of reactants (I) to zirconium atom of reactant (II) is from 1:0.05 to 1:5,
      the ratio of magnesium atom of reactant (I) to silicon atom of reactant (III) is from 1:0.05 to 1:5,
      the ratio of magnesium atom of reactant (I) to aluminum atom of reactant (IV) is from 1:1 to 1:20 and
      the ratio of magnesium atom of reactant (I) to titanium atom of reactant (V) is from 1:0.1 to 1:10:
      and the ratio of magnesium atom of reactant (I) to compound (VI) is from 1:01 to 1:10.

4. The method according to claim 3, wherein:
   reactant (I) is metal magnesium and n-butanol,
   reactant (II) is a zirconium tetrabutoxide,
   reactant (III) is tetramethoxysilane and tetraethoxysilane,
   reactant (IV) is i-butylaluminum dichloride, and
   reactant (V) is titanium tetrachloride.

* * * * *